(No Model.)

W. O. WORTH.
BICYCLE.

No. 444,868. Patented Jan. 20, 1891.

Attest.
J. W. Brainerd.
Frank G. Clark

Inventor.
William O. Worth,
By J. M. St. John,
Atty.

UNITED STATES PATENT OFFICE.

WILLIAM O. WORTH, OF CEDAR RAPIDS, IOWA, ASSIGNOR TO THE CHICAGO BICYCLE COMPANY, OF SAME PLACE.

BICYCLE.

SPECIFICATION forming part of Letters Patent No. 444,868, dated January 20, 1891.

Application filed November 4, 1889. Serial No. 329,202. (No model.)

*To all whom it may concern:*

Be it known that I, WILLIAM O. WORTH, a citizen of the United States, residing at Cedar Rapids, in the county of Linn and State of Iowa, have invented certain new and useful Improvements in Bicycles; and I do hereby declare the following to be a full, clear, and exact description of the invention, such as will enable others skilled in the art to which it appertains to make and use the same.

This invention relates to that style of bicycles commonly known as "Safety" bicycles; and the object of the invention is to improve the mounting of the front or steering wheel so as to secure economy in manufacture, neatness in appearance, and greater comfort to the rider.

The invention consists in the construction, combination, and arrangement of parts, as hereinafter fully set forth and claimed.

Figure 1:
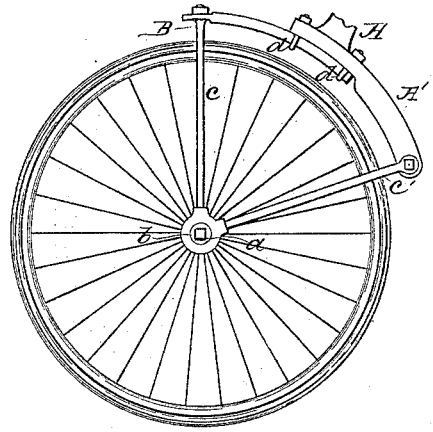
Figure 4:
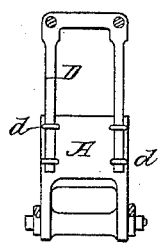
Figure 5:
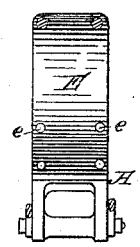
Figure 2:
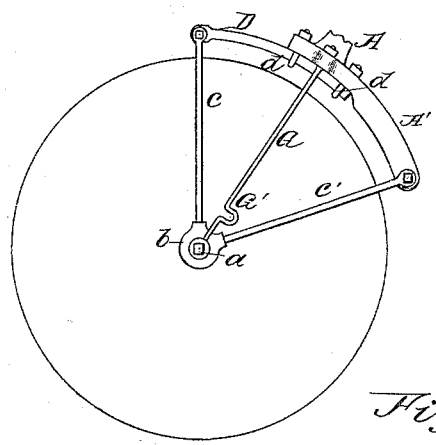
Figure 3:
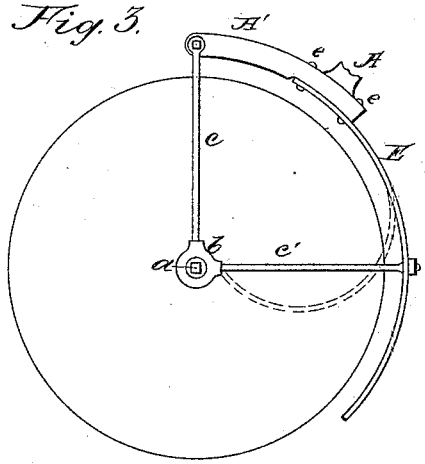

In the accompanying drawings, forming a part of this specification, Figure 1 is a side elevation of a device embodying my invention; Figs. 2 and 3, similar views showing modified forms of the same; Fig. 4, a plan view from the under side of the device shown in Fig. 1; Fig. 5, a similar view of a modification, showing a flat spring instead of the stirrup-spring shown in Fig. 4; and Fig. 6, a front elevation showing the device applied to a standard on but one side of the wheel.

Similar letters of reference indicate corresponding parts.

Referring to the drawings, A is the steering-head of a Safety bicycle of a conventional type. (Not shown.) At the upper end of this steering-head, as will be understood, the handle-bar is attached.

B is the standard or fork, to which the wheel C is mounted by its axle $a$, secured to the flange $b$ of said fork. This fork has diverging arms $c$ and $c'$, the former extending upwardly in about a vertical direction and the latter backwardly, as shown. In practice I prefer to make the fork in the form shown in Figs. 1 and 2, the parts $c\ c'$ being round rods and the part $b$, to which the axle is secured, a casting, into which the rods are screwed or otherwise firmly fixed. To this fork is attached the steering-head, which is also of novel construction, as shown in the drawings, having an arm $A'$ extending from its lower end rearwardly or forwardly and adapted to connect with one or both arms of the fork, the whole thus forming a triangular support for the wheel, which is light, strong, and neat in appearance.

To give the desired elasticity to the front end of the bicycle, a portion of the connection of the steering-head with the fork is made flexible, and in practice I therefore make one extension of the steering-head a spring. This may be of the stirrup form of D in Fig. 4, or a flat curved spring E or F, as in Figs. 3 and 5. In Fig. 3 the spring is represented as extending down on the rear side of the wheel to serve as a dust and mud guard or fender. The stirrup-spring is fastened to the steering-head by means of clips $d$ and the flat spring by rivets or bolts $e\ e$. By pivotally coupling the arm of the steering-head to the one arm of the fork, I secure the desired vibration in the plane of the wheel's periphery and at the same time avoid any objectionable lateral vibration.

Instead of a rigid arm, one arm of the fork may be flexible, as indicated by the dotted lines in Fig. 3.

Figure 6:
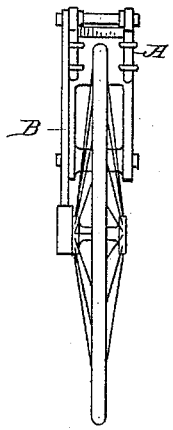

Though a "fork," strictly so called, is preferred, it is not absolutely necessary to the application and operation of this device, and the same is shown in Fig. 6 as applied to a standard on but one side of the wheel.

A supplemental intermediate brace G to stiffen the device still more against lateral vibration is shown in Fig. 2. This is secured at one end to the steering-head and at the other to the hub of the fork. In its simplest form this brace is a straight rod connecting the parts. To admit of a limited vibration in the line of its length, it may be provided with a return bend or offset $G'$.

Having thus described my invention, what I claim as new, and desire to secure by Letters Patent, is—

1. In a bicycle, the combination of a fork having outwardly-diverging arms, one of them flexible, and a steering-head having a rigid arm extending from its lower end in the plane of the wheel's periphery and connecting with said fork, substantially as and for the purpose set forth.

2. In a bicycle, the combination, with a fork substantially as described—that is to say, having outwardly-diverging arms—of a steering-head having a rigid extension in the plane of the wheel's periphery and a spring-connection with the arm of the fork opposite thereto, substantially as and for the purpose set forth.

3. In a bicycle, the combination, with a fork having diverging radial arms, of a steering-head having a rigid forwardly-extending arm connecting with one arm of the fork and a rearwardly and downwardly extending spring connecting with the other arm of the fork and adapted to serve as a fender, substantially as set forth.

4. In a bicycle, the combination, with a fork having diverging radial arms and a steering-head having a flexible connection with the outer extremities of said arms, of an intermediate brace extending from the steering-head to a connection with the fork between its arms, substantially as and for the purpose set forth.

5. In a bicycle, the combination, with a fork having diverging radial arms and a steering-head having a flexible connection with the extremities of said arms, of a brace connecting the hub of said fork with the steering-head between said arms and having a bend or offset therein to admit of limited longitudinal vibration, substantially as set forth.

In testimony whereof I affix my signature in presence of two witnesses.

WILLIAM O. WORTH.

Witnesses:
H. B. HAWLEY,
S. W. BRAINERD.